United States Patent [19]

Yamanaka et al.

[11] Patent Number: 4,958,337

[45] Date of Patent: Sep. 18, 1990

[54] DISK RECORDING CHECKING METHOD FOR DETERMINING IF A DISK IS DEFECTIVE BY THE NUMBER OF ERRORS PRESENT

[75] Inventors: Toshihiro Yamanaka, Ikoma; Nobuyuki Horie, Yamatokoriyama; Shozou Kobayashi; Toshihisa Deguchi, both of Nara; Takeshi Yamaguchi, Tenri; Shigemi Maeda, Yamatokoriyama; Yoshiki Nishioka, Tenri; Teruki Sugiura, Yamatokoriyama, all of Japan

[73] Assignee: Sharp Kabushiki Kaisha, Osaka, Japan

[21] Appl. No.: 344,530

[22] Filed: Apr. 28, 1989

Related U.S. Application Data

[63] Continuation of Ser. No. 16,932, Feb. 20, 1987, abandoned.

[30] Foreign Application Priority Data

Feb. 20, 1986 [JP] Japan .................................. 61-36067
Feb. 26, 1986 [JP] Japan .................................. 61-40801
Feb. 26, 1986 [JP] Japan .................................. 61-40803

[51] Int. Cl.$^5$ ............................................. G11B 19/00
[52] U.S. Cl. ....................................... 369/58; 369/111
[58] Field of Search .................... 369/54, 58, 59, 111; 360/47, 53; 371/5, 31, 38, 39, 40

[56] References Cited

U.S. PATENT DOCUMENTS

| 4,146,099 | 3/1979 | Matsushima et al. | 371/31 X |
| 4,152,695 | 5/1979 | Democrate et al. | 360/47 X |
| 4,562,577 | 12/1985 | Glover et al. | 371/39 X |
| 4,611,314 | 9/1986 | Ogata et al. | 369/111 X |
| 4,718,067 | 1/1988 | Peters | 371/31 X |
| 4,731,774 | 3/1988 | Furukawa | 369/59 |
| 4,748,611 | 5/1988 | Tsuyoshi et al. | 369/59 |
| 4,796,110 | 1/1989 | Glass et al. | 371/39 X |

FOREIGN PATENT DOCUMENTS

| 0127732 | 12/1984 | European Pat. Off. |
| 0137425 | 4/1985 | European Pat. Off. |
| 3303627 | 8/1984 | Fed. Rep. of Germany |
| 60-59540 | 4/1985 | Japan ....... 369/54 |

OTHER PUBLICATIONS

English Translation of JP 60-59540.
IBM Technical Disclosure Bulletin-vol. 26, No. 11, Apr. 1984.

Primary Examiner—Aristotelis M. Psitos

[57] ABSTRACT

A disk recording checking method in which recording is performed on a disk having radially different recording tracks each divided circumferentially into a plurality of sectors. The method employs a continuous writing device for continuously writing data onto a predetermined number of the sectors, and a continuous checking device for checking the data, while continuously reading the data from the predetermined number of the sectors. The method utilized checks both the number of errors in each code sequence and the total number of errors in each sector to determine if the data in the sector is valid.

7 Claims, 6 Drawing Sheets

DISK RECORDING CHECKING METHOD FOR DETERMINING IF A DISK IS DEFECTIVE BY THE NUMBER OF ERRORS PRESENT

This application is a continuation of application Ser. No. 06/016,932 filed on Feb. 20, 1987, now abandoned.

BACKGROUND OF THE INVENTION

The present invention generally relates to a checking method for a disk recording apparatus, and more particularly, to a disk recording checking method in which it is possible to judge at the time of recording whether or not a series of data have been recorded on predetermined sectors of a recording track of on a disk.

Conventionally, in a disk recording apparatus in which recording is performed on a disklike recording medium having a radially coaxial or spiral recording track divided into a predetermined plural number of sectors each acting as a recording unit, it has been a common practice that where recording is performed continuously on a plurality of the sectors, a check as to whether or not the recording has been performed properly is carried out by reading the contents in each of the sectors each time recording has been performed in each of the sectors. This known recording method has been disadvantageous in that it is difficult to reduce the recording time due to the waiting time required for rotating the disk.

In a prior art sector data validating method for validating data of sectors of a recording track on a magneto-optical disk, etc., at the time of reading immediately after the writing (referred to as "RAW" (Read After Write), one sector is divided into a plurality of code sequences. Each of the code sequences is constituted by a data portion and an error-checking code portion. In this arrangement, if the error-checking code portion is made larger in size in each of the code sequences, more errors in the data portion can be dealt with by the error-checking code portion. However, data efficiency drops due to the increase of the ratio of the error-checking code portion to each of the code sequences. Therefore, the ratio between the data portion and the error-checking code portion in each of the code sequences is determined by considering the characteristics of the recording medium, the error correcting method, etc.

In the prior art sector data validating method, the data of the sector is regarded as being valid if the total number of errors in the sector is not more than the total number of correctable errors in the error-checking code portions. However, where the number of errors in the sector is approximate to the limit of the correctable errors in the error-checking code portions during a check at the time of reading immediately after writing, i.e., during a RAW check, such an undesirable phenomenon may take place in that the number of errors in the sector exceeds the limit of the correctable errors due to adherence of dust to the recording medium which has accumulated after the recording process. These additional errors will only become detected during ordinary reproduction performed upon a lapse of a predetermined time period after writing, and thus, it becomes impossible to correct the errors by the error-checking code portions. Especially, when using a recording medium having a poor signal-to-noise ratio, e.g., the magneto-optical disk, etc., this effect becomes conspicuous.

SUMMARY OF THE INVENTION

Accordingly, an essential objective of the present invention is to provide an efficient disk recording checking method which reduces a recording time.

Another important object of the present invention is to provide a sector data validating method whose reliability is enhanced.

In order to accomplish these objectives of the present invention, there is provided a disk recording checking method according to the present invention in which recording is performed on a disk having radially different recording tracks, each track being divided circumferentially into a plurality of sectors, which comprise a continuous writing means for continuously writing on a predetermined number of the sectors data to be recorded and a continuous checking means for checking the data while continuously reading the data from the predetermined number of the sectors.

BRIEF DESCRIPTION OF THE DRAWINGS

These objectives and features of the present invention will become apparent from the following description taken in conjunction with the preferred embodiments and with reference to the accompanying drawings, in which.

Before the description of the present invention proceeds, it is to noted that like parts are designated by like reference numerals throughout the several views of the accompanying drawings.

DETAILED DESCRIPTION OF THE INVENTION

Figure 1:
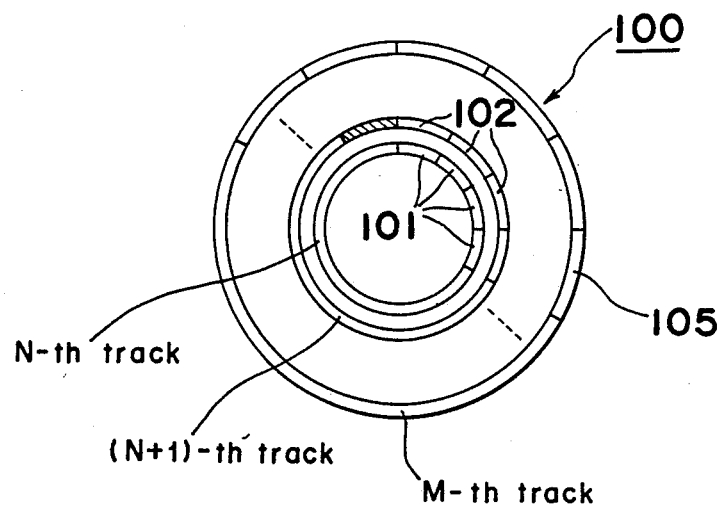
FIG. 1 is a schematic view of a disk recording medium employed in a disk recording checking method according to the present invention.

Referring now to the drawings, there is shown in FIG. 1, a disk recording medium 100 employed in a disk recording checking method according to the present invention. Assuming that reference characters N and M denote natural numbers and the natural number M is larger than the natural number N, the disk recording medium 100 includes an N-th recording track, an (N+1)-th recording track, —, and an M-th recording track which are coaxial and are situated radially from each other in an outward direction. The N-th recording track includes a plurality of sectors 101 while the (N+1)-th recording track includes a plurality of sectors 102. Likewise, the M-th recording track includes a plurality of sectors 105. It is to be noted, that although the coaxial recording tracks are provided on the disk recording medium 100 in FIG. 1, the present invention can be similarly applied to a disk recording medium in which a single spiral recording track divided into a plurality of sectors is provided. Writing and reading of data onto the disk recording medium 100 is usually performed per sector.

Figure 2:
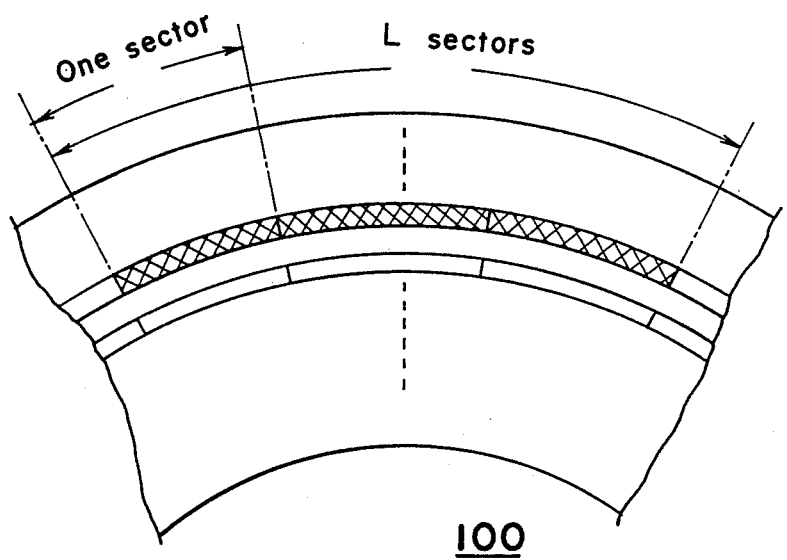
FIG. 2 is an enlarged fragmentary view of FIG. 1.

FIG. 2 is an enlarged fragmentary view of FIG. 1. As shown in FIG. 2, writing has been conventionally performed per sector. Meanwhile, in the present invention, writing is performed per block of a predetermined number of sectors, for example, L (L=natural number) sectors.

Figure 3:
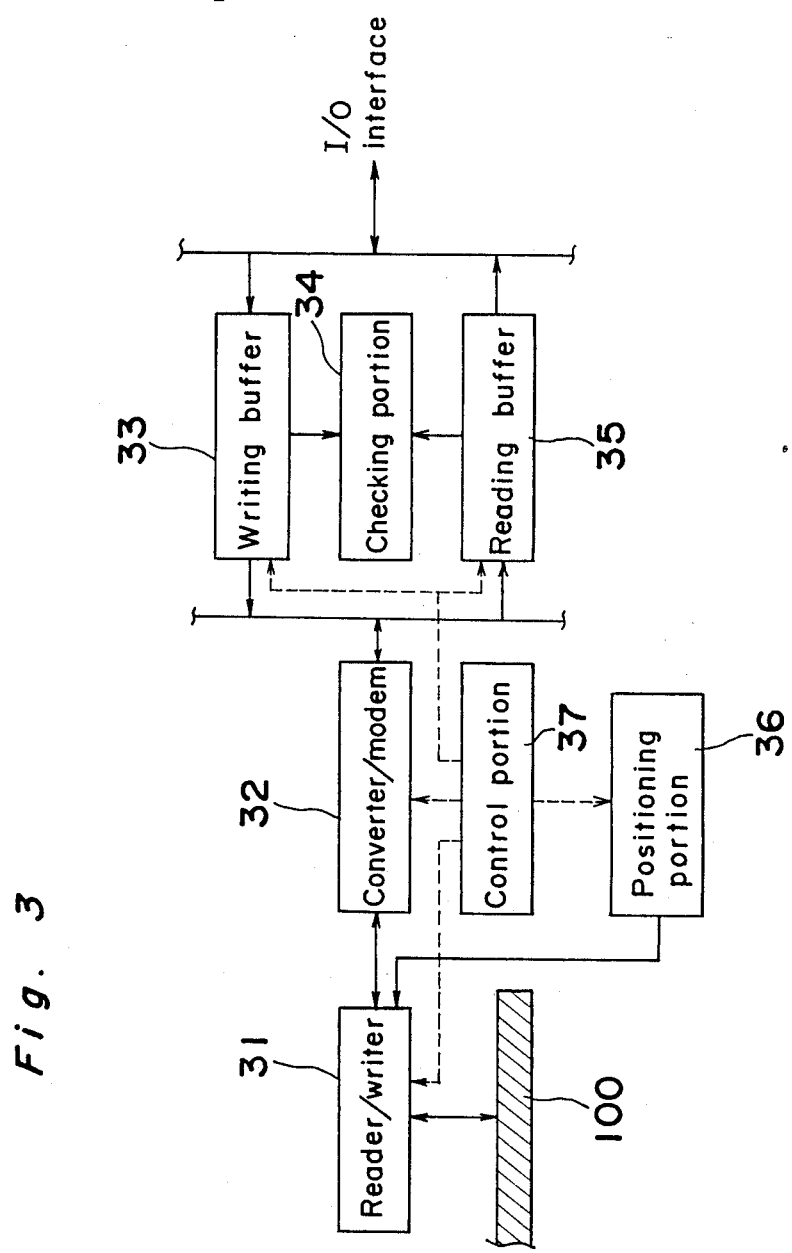
FIG. 3 is a block diagram showing a disk recording apparatus to which the disk recording checking method of FIG. 1 may be applied.

FIG. 3 shows a disk recording apparatus to which the disk recording checking method of the present invention may be applied. The inputting and outputting of read-write data between the disk recording apparatus and a host apparatus (not shown) are performed through a writing buffer 33 and a reading buffer 35. Data in the writing buffer 33 is encoded by a converter/modem 32 into a signal having a form convenient for recording onto the disk recording medium 100. The signal is then written onto the disk recording medium 100 by a reader/writer 31. The data written onto the disk recording medium 100 is read by the reader/writer 31. This data is then demodulated and decoded by the converter/modem 32 so as to stored in the reading buffer 35. In this case, the reader/writer 31 is positioned to writing and reading positions on the disk recording medium 100 by a positioning portion 36 employing a servo mechanism or the like. A decision as to whether or not the data in the writing buffer 33 has been correctly written onto the disk recording medium 100 is usually made in a procedure in which the data written on a portion of the disk recording medium 100 is read immediately after the writing of the data. A check is then made as to whether or not there is an error by adding an error-checking code the data read from the portion of the disk recording medium 100. This procedure is performed by a checking portion 34. The reader/writer 31, the converter/modem 32, the writing buffer 33, the checking portion 34, the reading buffer 35 and the positioning portion 36 are controlled by a control portion 37.

Figure 4:
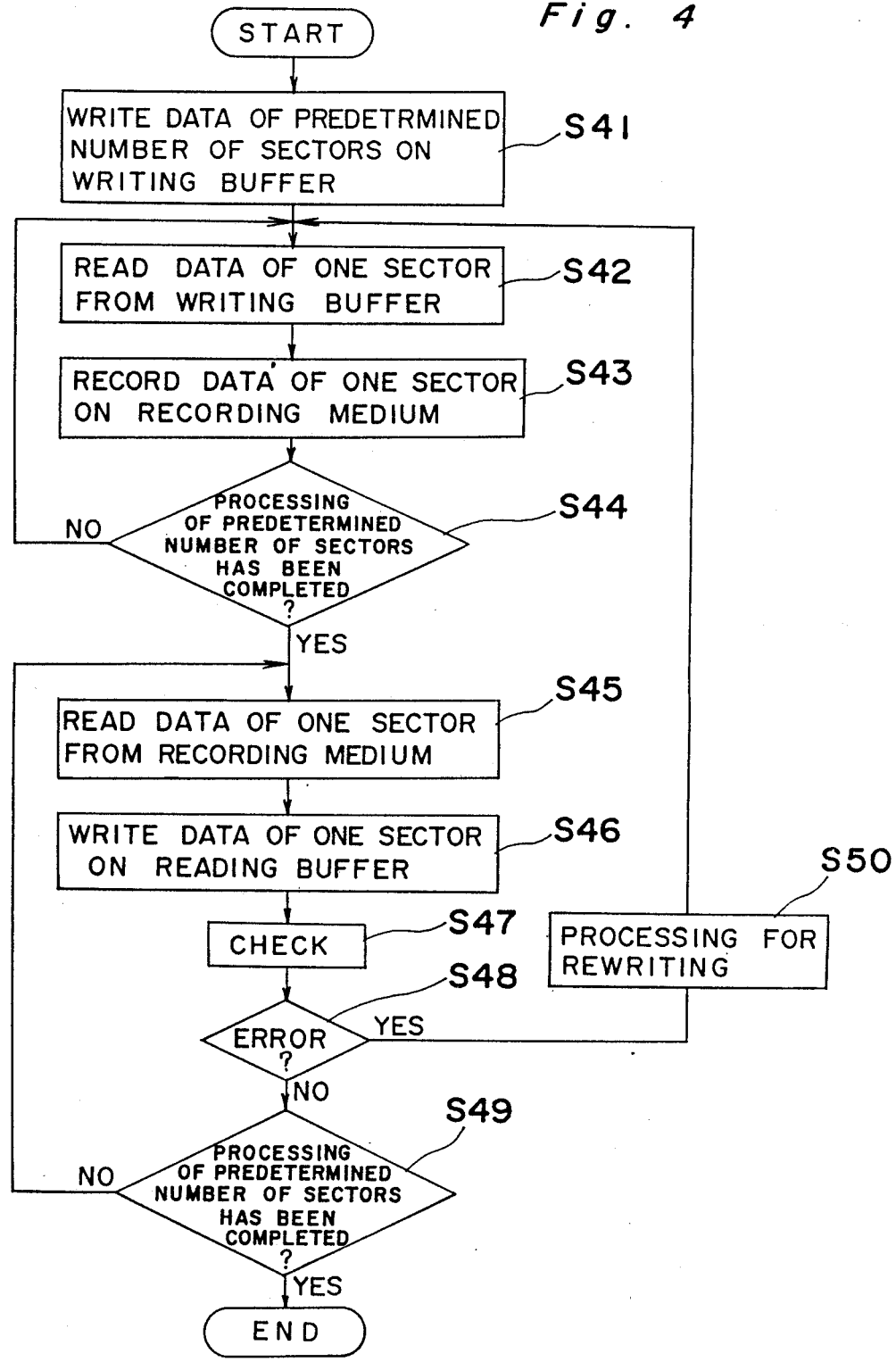
FIG. 4 is a flow chart showing a processing sequence of a control program employed in the disk recording checking method of FIG. 1.

The processing sequence of the disk recording checking method of the present invention is described with reference to a flow chart of FIG. 4. Initially, data of a predetermined number of sectors is written, through an I/O interface, into the writing buffer 33 from the host apparatus at step S41. The data written into the writing buffer 33 is read per sector at step S42 and is then subjected the above described encoding and modulation so as to be recorded onto the disk recording medium 100 at step S43. The above described processing is repeated until the processing has been performed for the predetermined number of the sectors at step S44. Subsequently, the data recorded per predetermined number of the sectors, as described above, is read from the disk recording medium 100 per sector at step S45 and is then, written into the reading buffer 35 at step S46. At the same time, by utilizing the adding of the error-checking code to the data or by collating the data with the data written in the writing buffer 33, a check is made at step S47 as to whether or not there is an error in the data. If it is found at step S48 that there is an error in the data, a processing for rewriting, for example, skip of defective sectors, change of the recording track, etc. is performed at step S50, and rewriting is then performed. On the other hand, if it is found at step S48 that there is no error in the data, the above described checking steps are repeated until the data of the predetermined number of the sectors has been checked at step S49, whereby the checking operation has been completed.

In the present invention, the data read after recording is not performed per sector as in the prior art disk recording checking method. Namely, in accordance with the present invention, the data is continuously written on the predetermined number of the sectors and is then checked while being read continuously from the predetermined number of the sectors, thereby improving checking efficiency and reducing recording time.

Figure 5:
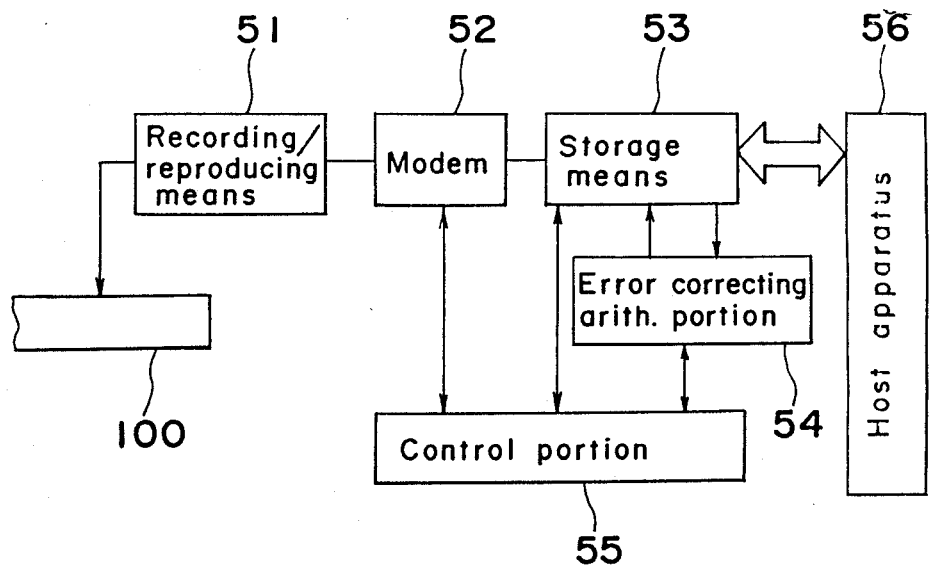
FIG. 5 is a block diagram showing a disk recording apparatus to which a sector data validating method according to the present invention may be applied.

Referring to FIG. 5, there is shown a disk recording apparatus to which a sector data validating method according to the present invention may be applied. The disk recording apparatus includes a recording/reproducing means 51, a modem 52, a storage means 53, an error correcting arithmetic portion 54, a control portion 55 and a host apparatus 56. The recording/reproducing means 51 performs recording onto or reproduction from the disk recording medium 100. The modem 52 modulates the data reproduced from the disk recording medium 100 by the recording/reproducing means 51 or modulates the data to be recorded onto the disk recording medium 100. The storage means 53 stores the data reproduced from the modem 52 and the data to be transferred to the modem 52. The storage means 53 further stores the recorded data transferred from the host apparatus 56 and the reproduced data to be transferred to the host apparatus 56. At the time of reproduction, a check is made by the error correcting arithmetic portion 54 as to whether or not there is an error in the data stored in the storage means 53. The control portion 55 controls the modem 52, the storage means 53 and the error correcting arithmetic portion 54.

Figure 7:
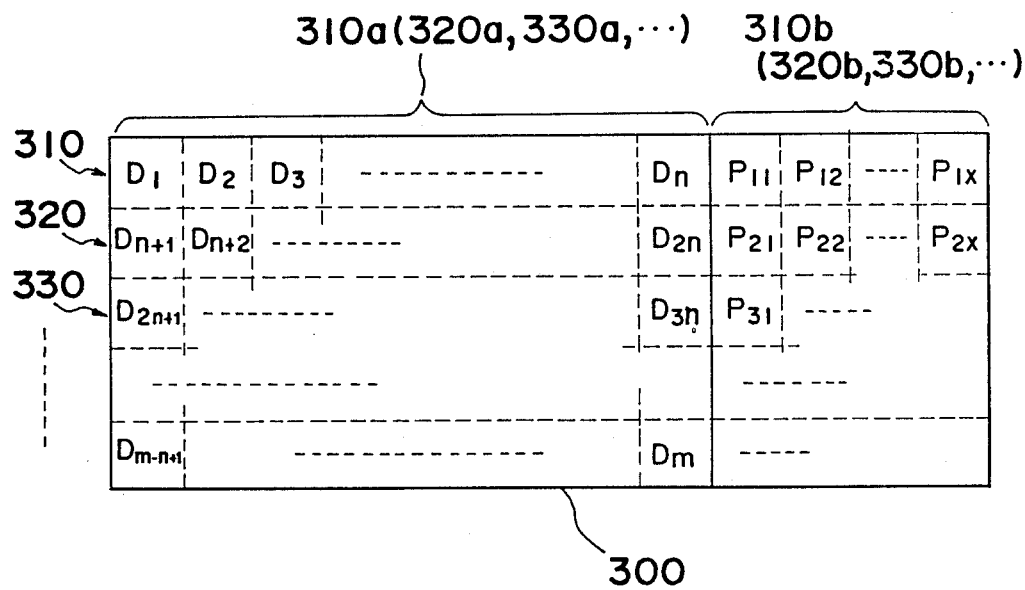
FIG. 7 is a schematic view of a format of data in a sector of a recording sector of a disk employed in the sector data validating method of FIG. 5.

FIG. 7 shows a conceptual format of the data in one sector of the disk recording medium 100 employed in the sector data validating method of the present invention. The sector is divided into a plurality of code sequences 310, 320, 330, —and each of the code sequences is constituted by a data portion and an error-checking code portion. For example, the code sequence 310 is constituted by a data portion 310a and an error-checking code portion 310b, while the code sequence 320 is constituted by a data portion 320a and an error-checking code portion 320b. Likewise, the code sequence 330 is constituted by a data portion 330a and an error-checking code portion 330b. In FIG. 7, reference characters $D_1, D_2, —, D_m$ (m=a natural number) denote m user data to be recorded and reference characters $P_{11}, P_{12}, —, P_{1x}, P_{21}, P_{22}, —, P_{2x}, P_{31}, —$ denote parity data for detecting and correcting errors in the user data at the time of reproduction. This format indicates that each of the constituent units $D_1, D_2, —, D_m; P_{11}, P_{12}, —$ constitute one byte.

At the time of recording of the data, an error detecting and correcting code is added to each of the code sequences by the error correcting arithmetic portion 54. The parity data $P_{11}, P_{12}, —, P_{1x}$ (x=a natural number) are provided for detecting and correcting errors in the n user data (n=a natural number) $D_1, D_2, —, D_n$ of the code sequence 310 of the first row, while the parity data $P_{21}, P_{22}, —, P_{2x}$ are provided for detecting and correcting errors in the n user data $D_{n+1}, D_{n+2}, —, D_{2n}$ of the code sequence of the second row. The parity data are provided for the code sequences of the subsequent rows in the same manner as described above.

The data recorded on the disk recording medium 100 is read immediately after its recording such that a check (RAW check) as to whether or not the recording has been performed correctly is made by the error correcting arithmetic portion 54. Below a processing sequence of this RAW check is described with reference to the flow chart of FIG. 6. The data read from the disk recording medium 100 by the recording/reproducing means 51 is demodulated by the modem 52 and is then stored in the storage means 53 such that the number of errors in the data stored in the storage means 53 is counted for each of the code sequences by the error correcting arithmetic portion 54 at step S201. Supposing that the number of errors which can be corrected by the x parity data added to each of the code sequences is E (E=a natural number), a decision is made at step S202 as to whether or not the number of errors in each of the code sequences is larger than a predetermined natural number Es which is smaller than the number E. If the number of errors in one code sequence exceeds the number Es despite the fact that the data is read immediately after the recording, the sector is construed as having a risk of being defective. This information that the sector is defective is transmitted to the control portion 55 at step S205 completing the RAW check. If it is found at step S203 that the number of errors in any one of the code sequences does not exceed the number Es after the number of errors have been counted for all the code sequences, information that the sector is valid is transmitted to the control portion 55 at step S204 completing the RAW check.

Figure 6:
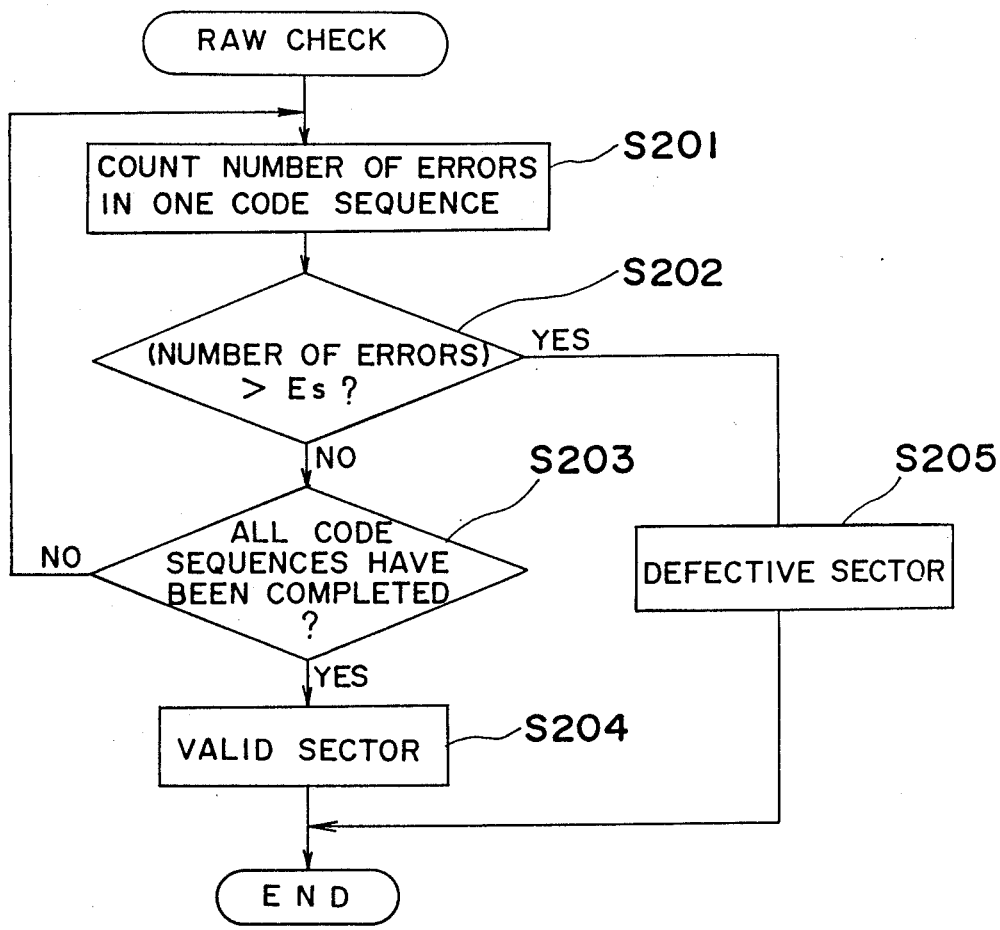
FIG. 6 is a flow chart of a processing sequence of the sector data validating method of FIG. 5.
Figure 8:
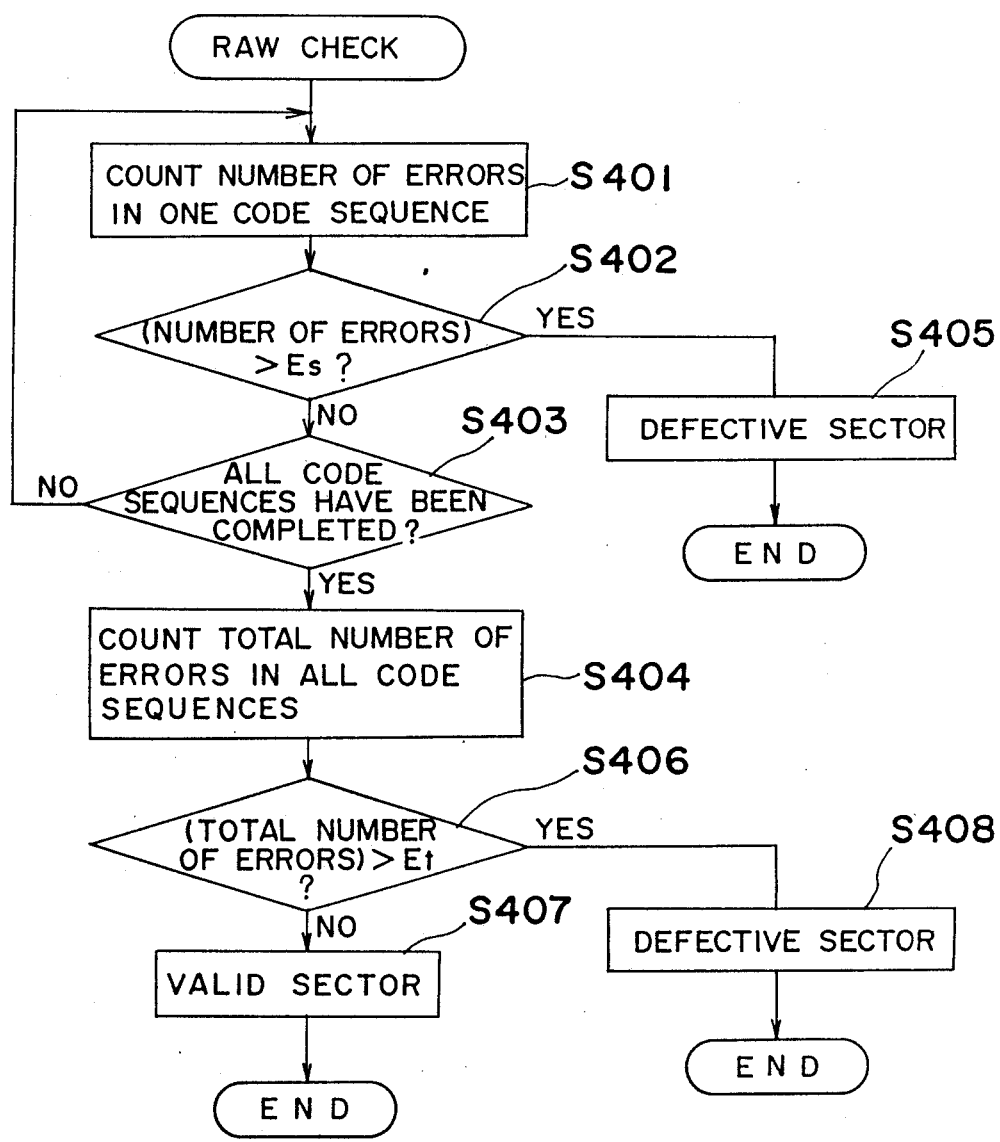
FIG. 8 is a flow chart, similar to FIG. 6, showing a modification of the method shown in FIG. 6.

FIG. 8 shows a modification of FIG. 6. Since steps S401 to S403 and step S405 of FIG. 8 are the same as steps S201 to S203 and S205 of FIG. 6, respectively, their detailed description is abbreviated for the sake of brevity. If it is found at step S403 that the number of errors in any one of the code sequences does not exceed the number Es after the number of errors has been counted for all the code sequences, the program flow proceeds to steps S404. At step S404, a total number of errors detected in all the code sequences, i.e., one sector, is counted. If it is found at step S406 that the total number of errors of all the code sequences does not exceed a predetermined constant Et (Et= a natural number), information that the sector is valid is transmitted to the control portion 55 at step S407 completing the RAW check. The constant Et is set at a value not more than a total number of correctable errors in all the code sequences. This total number is equal to a product of the number of the code sequences in the sector and the number Es. On the other hand, if it is found at step S406 that the total number of errors in the sector exceeds the constant Et, information that the sector is defective is transmitted to the control portion 55 at step S408 completing the RAW check.

The processing of steps S404 through S408 is performed so as to evaluate quality of the sector in addition to the processing of step S402. For example, where Es errors exist in every one of the code sequences of the sector, the sector is not regarded as being defective at step S402. However, since a defective state can be created by burst type errors existing in the sector, it is impossible to say that the sector is of high quality. The processing of steps S404 through S408 is performed so as to detect such an undesirable sector.

As is clear from the foregoing description, in the sector data validating method of the present invention, since the validity criterion of each of the code sequences of the sector is set at the number Es which is smaller than the number E of errors which can be corrected by the parity data of each of the code sequences, validity of the data can be judged positively by the RAW check where the number of errors in each of the code sequences is approximate to the number E of the correctable errors, thereby enhancing reliability of the data. Furthermore, since the validity criterion is set at the number Es which is smaller than the number E of the correctable errors, it becomes possible to reduce the time period required for correcting errors of the data.

Meanwhile, in the modified sector data validating method of the present invention, validity of the sector data is judged on the basis of a decision as to whether or not the total number of errors in the sector exceeds the predetermined value Et which is not more than the total number of correctable errors in all the code sequences in addition to a decision as to whether or not the number of errors in each of the code sequences exceeds the number Es. Thus, in accordance with the present invention, where the number of errors in each of the code sequences is approximate to the limit E of the correctable errors, validity of the sector data can be checked positively by the RAW check, thereby resulting in further enhancement of reliability of the data. Moreover, since the validity criterion is set at the number Et which is not more than the number of the correctable errors in the sector, it becomes possible to reduce the time required for correcting errors of the data.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A disk recording error checking method, comprising the steps of:
   (a) establishing a predetermined number of acceptable errors;
   (b) writing data onto a disk in a form of sectors, each sector being formed of code sequences, each code sequence including a data portion and a parity portion;
   (c) reading a complete sector of data from the disk immediately after completing said step (b);
   (d) counting a number of errors in one individual code sequence of the read sector;
   (e) determining if the number of errors counted in said step (d) is greater than the predetermined number of acceptable errors established in said step (a);
   (f) determining if all of the code sequences of the read sector have been processed by said steps and (d) and (e) only when said step (e) has determined that the number of errors counted in said step (d) is not greater than the predetermined number of acceptable errors;
   (g) repeating said steps (d), (e), and (f) only when said step (f) has determined that all of the code sequences of the read sector have not been processed;
   (h) indicating that the read sector of said step (c) is valid only when said step (f) has determined that all of the code sequences of the read sector have been processed; and (i) setting the predetermined number of accepted errors to a value less than a number of correctable errors in each individual code sequence.

2. The method as claimed in claim 1, further comprising the step of:
   (j) indicating that the read sector of said step (e) is defective only when said step (e) determines that the number counted in said step (d) is greater than the predetermined number of acceptable errors.

3. The method as claimed in claim 1, further comprising the step of:
   (1) setting the predetermined number of acceptable errors to a value less than a number of correctable errors in each individual code sequence.

4. A disk recording error-checking method, comprising the steps of:
   (a) establishing a predetermined number of acceptable errors;
   (b) writing data onto a disk in a form of at least one sector, each sector being formed of at least one code sequence, each code sequence including a data portion and a parity portion;
   (c) reading a complete sector of data from the disk immediately after completing said step (b);
   (d) counting a number of errors in one individual code sequence of the read sector;
   (e) determining if the number of errors counted in said step (d) is greater than the predetermined number of acceptable errors established in said step (a);
   (f) determining if all of the code sequences of the read sector have been processed by said steps (d) and (e) only when said step (e) has determined that the number of errors counted in said step (d) is not greater than the predetermined number of acceptable errors;
   (g) repeating said steps (d), (e), and (f) only when said step (f) has determined that all of the code sequences of the read sector have not been processed;
   (h) counting a total number of errors, the total number of errors being a sum of the number of errors counted in each individual code sequence of the read sector;
   (i) determining if the total number of errors counted in said step (h) is greater than a predetermined value, the predetermined value being a total number of acceptable errors;
   (j) indicating that the read sector of said step (c) is valid only when said step (i) has determined that the total number of errors counted in said step (h) is not greater than the predetermined value; and
   (k) setting the predetermined value to a number equal to a product of a total number of individual code sequences multiplied by a number of correctable errors in an individual code sequence.

5. The method as claimed in claim 4, further comprising the step of:
   (l) indicating that the read sector of said step (c) is defective only when said step (e) determines that the number of errors counted in said step (d) is greater than the predetermined number of acceptable errors.

6. The method as claimed in claim 4, further comprising the steps of:
   (l) indicating that the read sector of said step (c) is defective when said step (i) determines that the total number of errors counted in said step (h) is greater than the predetermined value.

7. The method as claimed in claim 4, further comprising the steps of:
   (l) indicating that the read sector of said step (c) is defective only when said step (e) determines that the number of errors counted in said step (d) is greater than the predetermined number of acceptable errors; and
   (m) indicating that the read sector of said step (c) is defective when said step (i) determines that the total number of errors counted in said step (h) is greater than the predetermined value.

* * * * *